Figure 1:
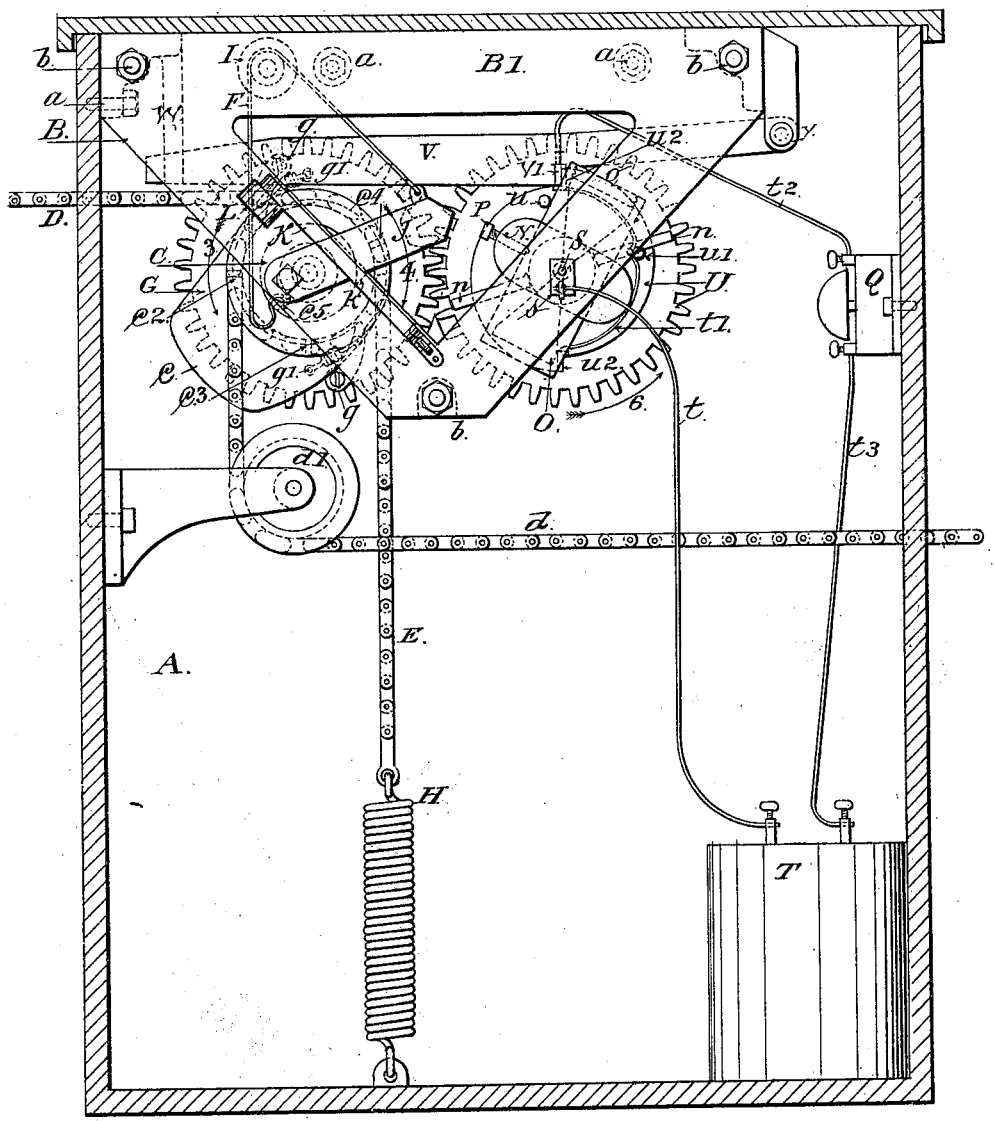

No. 621,550. Patented Mar. 21, 1899.
J. H. WINSPEAR & F. R. SMITH.
AUTOMATIC MECHANISM FOR OPENING OR CLOSING ELECTRIC CIRCUITS.
(Application filed Apr. 5, 1897.)
(No Model.) 5 Sheets—Sheet 1.

WITNESSES:

James H. Winspear
Fred. R. Smith
INVENTORS

No. 621,550. Patented Mar. 21, 1899.
J. H. WINSPEAR & F. R. SMITH.
AUTOMATIC MECHANISM FOR OPENING OR CLOSING ELECTRIC CIRCUITS.
(Application filed Apr. 5, 1897.)

(No Model.) 5 Sheets—Sheet 2.

WITNESSES:
Thomas J. Davis
S. Y. Sansour

James H. Winspear
Fred. R. Smith
INVENTORS

No. 621,550. Patented Mar. 21, 1899.
J. H. WINSPEAR & F. R. SMITH.
AUTOMATIC MECHANISM FOR OPENING OR CLOSING ELECTRIC CIRCUITS.
(Application filed Apr. 5, 1897.)
(No Model.) 5 Sheets—Sheet 3.

WITNESSES:
Thomas J Davie
S. M. Samsom

INVENTORS
James H. Winspear
Fred R Smith

No. 621,550. Patented Mar. 21, 1899.
J. H. WINSPEAR & F. R. SMITH.
AUTOMATIC MECHANISM FOR OPENING OR CLOSING ELECTRIC CIRCUITS.
(Application filed Apr. 5, 1897.)
(No Model.) 5 Sheets—Sheet 4.
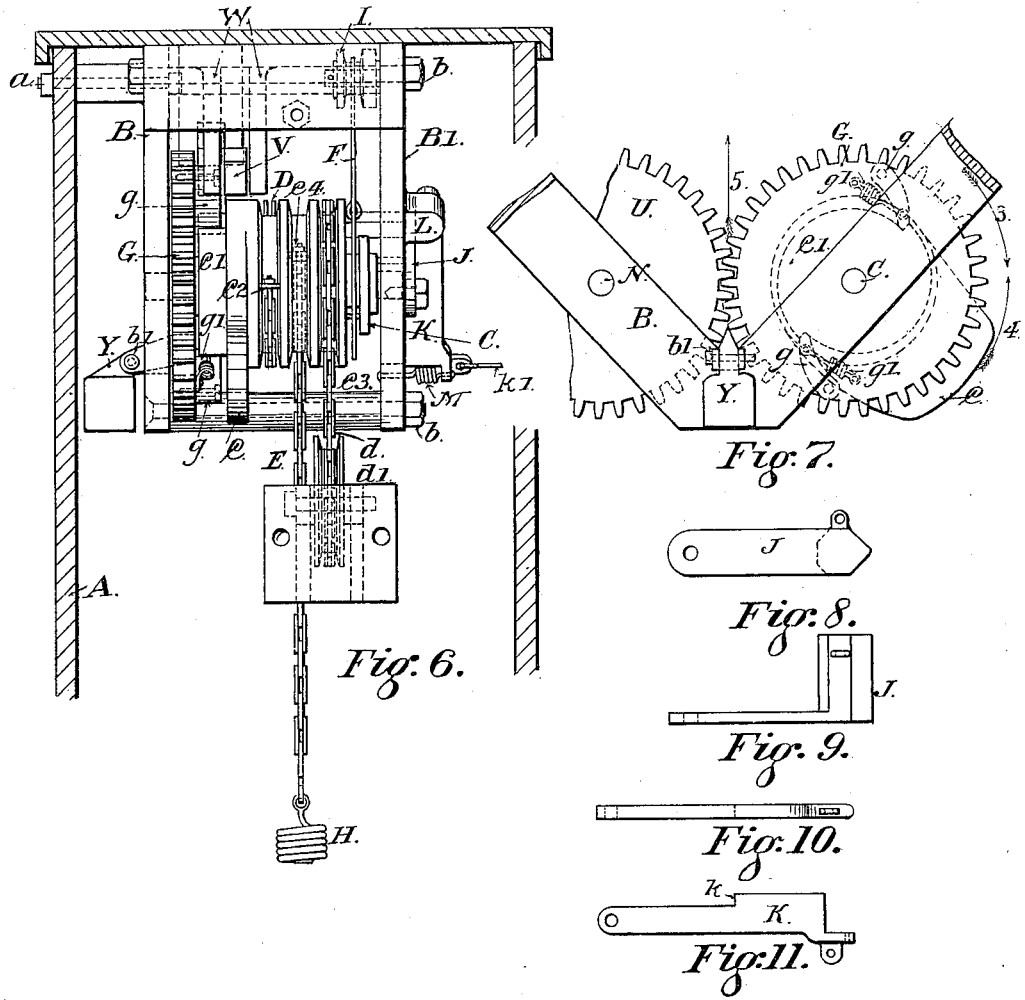
WITNESSES:
Thomas J. Davis
S. Y. Sansom
James H. Winspear
Fred R. Smith
INVENTORS No. 621,550. Patented Mar. 21, 1899.
J. H. WINSPEAR & F. R. SMITH.
AUTOMATIC MECHANISM FOR OPENING OR CLOSING ELECTRIC CIRCUITS.
(Application filed Apr. 5, 1897.)
(No Model.) 5 Sheets—Sheet 5.

WITNESSES:
Thomas J. Davis
S. Y. Sansom

James H. Winspear
Fred R. Smith
INVENTORS

UNITED STATES PATENT OFFICE.

JAMES H. WINSPEAR AND FRED R. SMITH, OF OMAHA, NEBRASKA.

AUTOMATIC MECHANISM FOR OPENING OR CLOSING ELECTRIC CIRCUITS.

SPECIFICATION forming part of Letters Patent No. 621,550, dated March 21, 1899.

Application filed April 5, 1897. Serial No. 632,045. (No model.)

*To all whom it may concern:*

Be it known that we, JAMES H. WINSPEAR and FRED R. SMITH, citizens of the United States, residing at Omaha, in the county of Douglas and State of Nebraska, have invented a new and useful automatic mechanism whereby make-and-break mechanism of an electric circuit being once operated is automatically operated again and in a contrary sense after a predetermined interval, of which the following is a specification.

For the purpose of illustration we have shown the invention as embodied in a signal apparatus adapted to be actuated primarily by a moving railway-train, and in this apparatus a battery signal-circuit is provided with make-and-break mechanism involving an hour-glass-like receptacle containing sand or its equivalent and revolubly mounted upon a central transverse axis. The sand is normally in the lower part of the receptacle, which is held slightly inclined by a stop, and its weight tends constantly to bring the center of gravity, which is below the axis, into the vertical plane of that axis, whereby the circuit is held open, (or closed, according to the arrangement originally chosen.) By suitable mechanism extraneous force—*e. g.*, that of a railway-train moving in either direction—may rotate the receptacle one hundred and eighty degrees on its axis, leaving it still inclined, but with the sand in its upper part, where by its weight it swings the receptacle from the stop mentioned, and thus holds the circuit closed (or open, if it was before closed) until the sand passing into the lower chamber again changes the position of the center of gravity and the receptacle is swung to its initial position. Evidently the interval between the half-rotation of the receptacle and its automatic movement depends upon the amount of sand and the character of the passage through which it flows.

Figure 2:
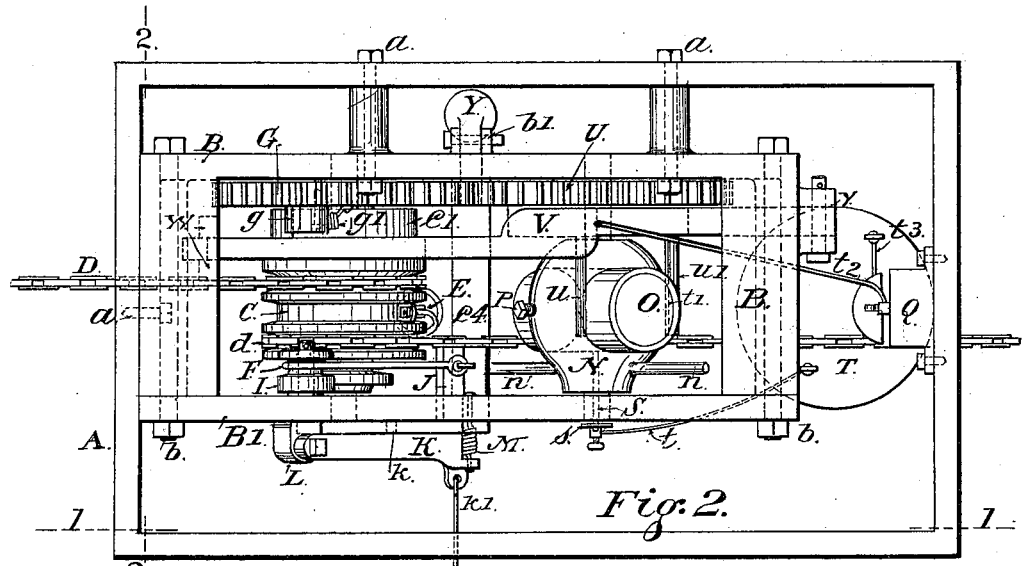
Figure 3:
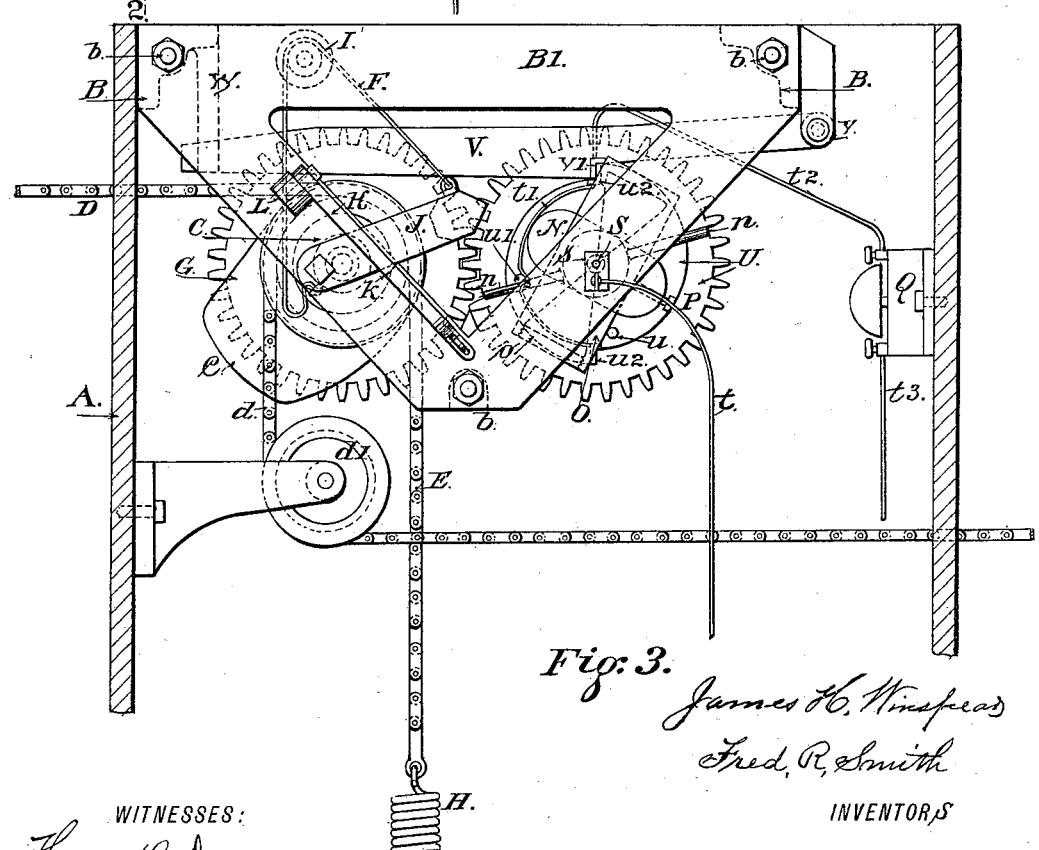
Figure 5:
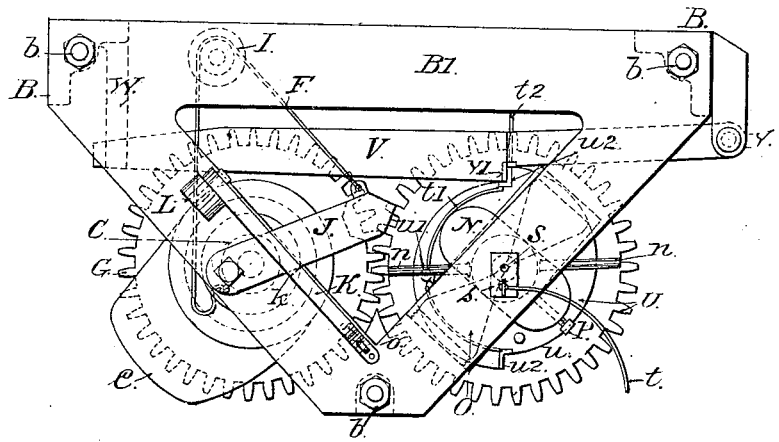
Figure 4:
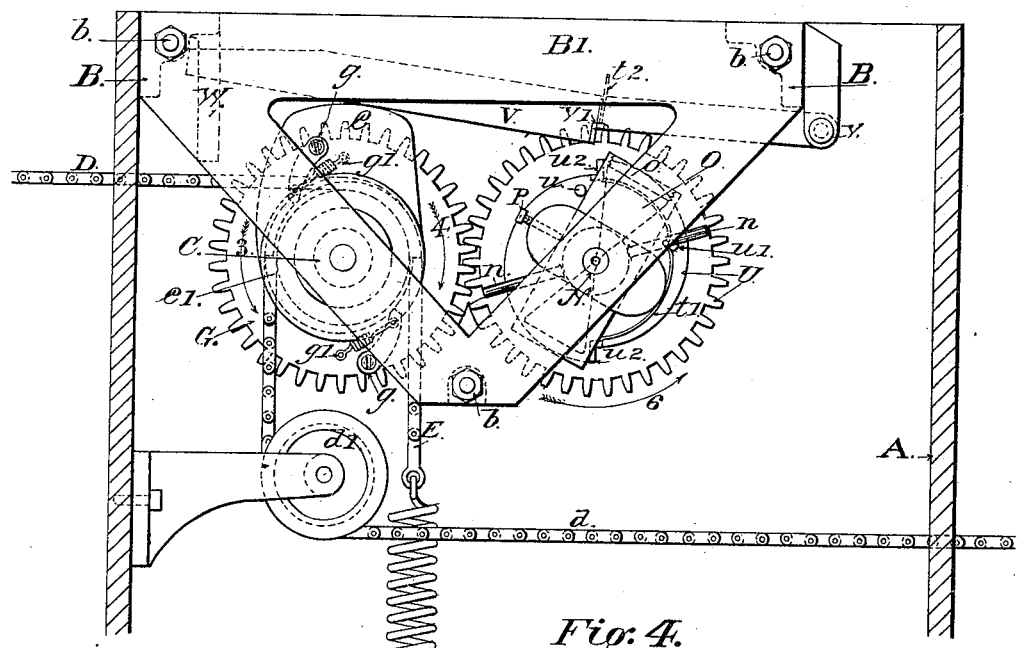
Figure 15:
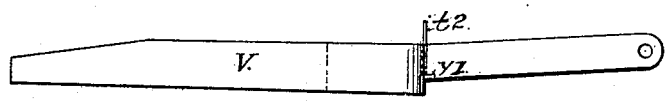
Figure 16:
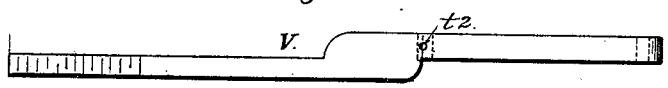
Figure 17:
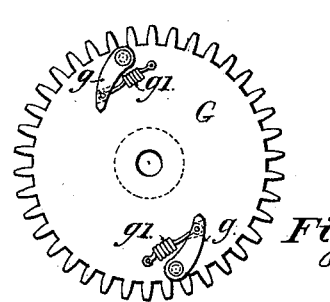

In the drawings, Figure 1 is a front elevation of the devices, the front wall of an inclosing box being removed. Fig. 2 is a plan view, the top of the box being removed. Figs. 3, 4, and 5 are partial front views illustrating different positions of the parts. Fig. 6 is a partial end elevation showing the parts in the positions of Fig. 1. Fig. 7 is a rear elevation of a small portion of the machine. Figs. 8, 9, 10, 11, 12, 13, 14, 15, 16, 17, 18, 19, 20, 21, and 22 are detail views.

In the views, A represents any suitable box containing a frame which consists of two parallel plates B B', cross-bars between the plates at top and bottom, and bolts $b$, uniting the parts to form a rigid whole. Between the two plates is revolubly mounted an elongated receptacle O, closed by a screw-cap $o$ and having in each end a chamber, the two communicating through a relatively small passage, whereby when the vessel contains a suitable amount of sand or the like it may act like an ordinary sand-glass. The vessel is of conducting material, and by means of a set-screw P it is held at its middle in a ring N, from which it is insulated by a layer J, Fig. 21, of some non-conducting substance. The vessel is fixed by a set-screw in order that, being removable, a differently-timed vessel may be readily substituted at any time. The ring is revolubly supported between the plates by gudgeons Z. (Seen in detail in Figs. 21 and 22.) This ring, with its gudgeons and set-screw, are simply convenient means for so supporting the vessel that it may rotate and oscillate on a central transverse axis. A conducting-plate $s$ is secured at the outer end of one gudgeon and electrically connected with the receptacle O by a conductor S, insulated from other adjacent parts, and is also connected by a wire $t$ to a conveniently-located battery T. The object is to have the vessel make and break a circuit as it oscillates, and it is convenient to make the vessel itself of metal, so that it may form a part of the circuit. A ratchet-disk U and a contiguous gear U' (seen in elevation and plan in Figs. 19 and 20) are both mounted upon the other gudgeon and arranged for rotation normally independent of the rotation of the ring and the vessel mounted therein. The disk is provided with two diametrically opposite ratchet-teeth faced, respectively, with conducting-plates $u^2$ and is also provided with arms $u$ $u'$, which lie upon opposite sides of the vessel O and compel the latter to rotate with the disk, while at the same time leaving it free to oscillate within narrow limits. The plates $u^2$ are electrically connected by wires $t'$ with the arm $u'$ and with the vessel O since the arm $u'$ is itself a conductor, whenever the vessel is in contact with this arm. Above the disk and in its plane is a long notched bar V, Figs. 15 and 16, pivoted to the frame at $y$ and swinging vertically in guides W at the other end of the frame to serve as a pawl engaging the disk at proper times. The engaging face of the pawl bears a conducting-plate $y'$, connected with the battery T by wires $t^2 t^3$, which include in the circuit a signal-bell Q. The wire $t^2$, plate $y'$, plates $u^2$, wire $t'$, and arm $u'$ are all insulated from the pawl and disk.

Figure 19:
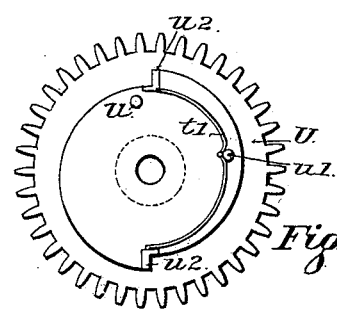
Figure 18:
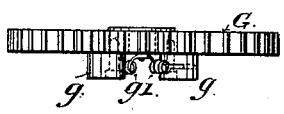
Figure 20:
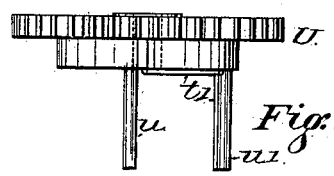
Figure 21:
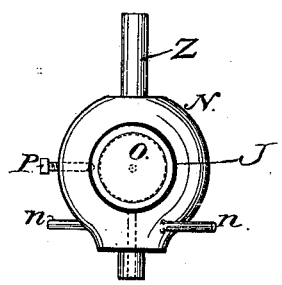
Figure 22:
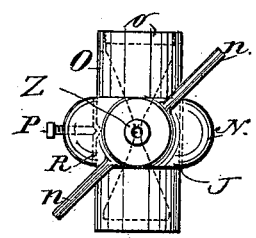

If the disk be in the position shown in Figs. 1, 19, and 20, and if the sand be in the upper compartment of the receptacle, gravity holds the latter in contact with the arm $u'$, as in Fig. 5; but when the sand has passed from the upper to the lower compartment gravity swings the vessel from the arm $u'$ and against the arm $u$. The time required for the transfer of the sand from the upper to the lower compartment is evidently a readily-variable constant. Whatever interval may be chosen, so long as contact continues, the pawl V being in engagement, the battery-circuit is completed through the wire $t$, plate $s$, conductor S, vessel O, arm $u'$, wire $t'$, plate $u^2$, plate $y'$, wire $t^2 t^3$, and the included signal-bell is sounded continuously; but when the vessel swings from the arm $u'$ circuit is broken and the bell ceases to ring. If the pawl be now raised and the disk be rotated one hundred and eighty degrees, the lower compartment into which the sand has passed becomes the upper compartment and the weight of the sand swings the vessel again to the arm $u'$, which is now below the axis of rotation and upon the opposite side of its vertical plane, again completing the circuit. It is plain that the disk being in the position shown in Fig. 1 or in that seen in Fig. 3 and the sand being in the lower compartment any force whatever that will rotate the disk one hundred and eighty degrees will by such rotation cause the signal to be operated until the sand passes into the other compartment and breaks the circuit in the manner already described.

Alongside the rotary apparatus thus far described is a drum C, mounted upon a shaft C', revoluble in bearings in the plates B B' and provided with guiding-grooves for chains D $d$ E, each of which normally passes partly around the drum and is connected thereto by attachment to that one of bridges $c^2 c^3 c^4$, Fig. 13, which extends across the corresponding groove. The chain D as it leaves the drum passes directly out of the box, which in railway signaling may be sunk alongside a railway-track to any suitable device, (not shown,) whereby a train passing in the proper direction may draw the chain outward a predetermined distance. The chain $d$ passes around a fixed pulley $d'$ and thence out at the opposite side of the box to similar devices arranged to be operated by a train passing in an opposite direction. By this means the drum is rotated in one direction through a certain angle by a train moving in either direction. The chain E passes around the drum in the opposite direction and its end is attached to a stout spring H, which yieldingly resists traction on either chain D $d$, and if the parts have been moved thereby restores them to initial position the instant such traction ceases. A normally slack cable F is attached to a bridge $c^5$ and passes in a suitable groove partly around a smaller portion of the drum, thence over a pulley I, and downward to the free end of a weighted lever J, (shown detached in Figs. 8 and 9,) pivoted at the other end to the frame. This lever is normally raised and is supported by a shoulder $k$ upon a bar K, pivoted at one end to a lug L upon the frame and having its free end drawn against the frame by a spring M. To this end of the bar K is attached a cable $k'$, arranged to be drawn outward through any suitable devices (not shown) by the train when after actuating the signal the train arrives at a certain point—e. g., a crossing. If the vessel O be in position to complete the signal-circuit, already described, and if the bar K be thus drawn outward, the weighted lever J falls and, striking either the one or the other of the two arms $n$ projecting from the ring, swings the vessel from the arm $u'$, breaking the signal-circuit.

A cam $c$, (shown in detail in Figs. 12, 13, and 14,) lying below and in the plane of the pawl-bar V, forms a part of the drum, and alongside and rotating with it is a ratchet-disk $c'$, having two diametrically opposite teeth. A gear G (seen detached in Figs. 17 and 18) is loosely mounted upon the shaft C' contiguous to the disk, and upon it are pivoted two diametrically opposite pawls $g$ in the plane of the disk and held against it by springs $g'$. The pawls and ratchet-teeth are so arranged that the rotation of the drum by the chains D $d$ has no effect upon the gear G, while by engagement they compel the gear to rotate when the drum is rotated in the contrary direction by the chain E, and as the gears G U are always in engagement they also force the vessel O to rotate. The cam $c$ is so arranged that when either chain D $d$ is drawn, rotating the drum, it raises the pawl V out of engagement with the ratchet-disk U' and holds it until the spring H, acting through the chain E, drum, ratchet-disk, pawls $g$, and gears G U, has carried the lately-engaged tooth of the disk U' beyond the point of engagement; but it drops the pawl V in time for the latter to engage the other tooth on the disk U' and thus prevent rotation through more than one hundred and eighty degrees. The gears G U always rotate in the same direction, and to allow free rotation in this direction, while absolutely preventing all contrary movement, a lever or locking-pawl V is pivoted to the frame in such position that its wedge-shaped end portion may fit between the gears below their engagement and prevent the teeth of one from entering the spaces between the teeth of the other. The outer end of the lever is weighted, so that the wedge is always yieldingly pressed into place, as seen in Fig. 7.

When all the parts are in place and properly adjusted, with the chains D d E connected to train-actuated devices, (of which many suitable forms are in common use,) a train moving in either direction draws one of the chains D d, rotates the drum, and thus by means of the cam c raises the pawl V, (see Fig. 4,) leaving the gears free to rotate in the direction permitted by the locking-pawl. When the train releases the chain, the spring H draws the chain E and rotates the drum and cam in the contrary direction, and as the pawls G then engage their ratchet the gears are rotated, together with the disk U and the vessel O; but before the latter has turned through one hundred and eighty degrees the cam c allows the pawl V to fall and rest upon its disk, so that it engages the tooth and arrests rotation after precisely one hundred and eighty degrees of movement, leaving the parts in the position of Fig. 3. In the state of rest the sand was in the lower compartment; but this has suddenly become the upper one, and the weight of the sand swings the vessel against the arm $u'$ and closes the signal-circuit, which then remains closed until broken by the accumulation of sand in the lower chamber, unless it is sooner broken by the train. It may be so broken, for if the train advances so far as to operate devices for drawing the bar K outward the weighted lever falls, striking one of the arms $n$ always in its path when the vessel is in such position as to complete the circuit, and without moving the ratchet mechanism or gear U swings the vessel from the arm $u'$. This new position does not interfere with the passing of the sand, which, indeed, of itself would have soon induced the same movement of the vessel. The lever J is raised again by the cable F when the drum is next rotated by the chains D d.

The devices constructed as set forth and properly arranged alongside the track of a railway are adapted to be actuated by a train passing in either direction toward, for example, a crossing and to produce a continuous signal, and if for any reason the train fails to pass the crossing to continue the signal, but for only a predetermined length of time.

"Sand-glass" as used herein designates any vessel of any material containing sand or its equivalent and acting like the ordinary sand-glass.

What we claim is—

1. The combination with a sand-glass revolubly mounted on a transverse central axis, of stops permitting the oscillation of the glass while keeping it inclined from a vertical position, means for reversing the position of its ends, and an electric circuit arranged to be made and broken as the sand swings the vessel against one stop when above the axis and against the other when it has passed into the compartment below the axis.

2. The combination with the drum, of two oppositely-extending chains attached to the same and arranged to rotate it in the same direction when tractional force is applied to either, a spring arranged to resist such rotation and to return the drum to initial position after such rotation, an electric circuit, make-and-break mechanism for said circuit, and mechanism operated by the return movement of the drum and itself actuating the make-and-break mechanism.

3. The combination with two engaging gears, of a wedge fitting and yieldingly pressed into the angular space between their peripheries; whereby rotation of the gears in one direction is prevented while contrary rotation is not impeded.

4. The combination with the drum, of means for imparting thereto limited rotary motion alternately in opposite directions, an electric circuit, a pivoted lever arranged to open or close the circuit in falling to a certain position, a cable winding and unwinding upon the drum and connected to said lever to raise it in winding, a stop automatically preventing the falling of the raised lever, and means for withdrawing said stop from effective position.

5. The combination with a revolubly-mounted drum, of a cable winding thereon, a weight attached to the cable, means for rotating the drum and raising the weight, automatic devices for giving the drum equal reverse rotation, a stop automatically preventing the descent of the weight, and means for suddenly moving the stop and allowing the weight to descend.

6. The combination with a disk mounted to rotate upon an axis, of a sand-glass independently revoluble about its middle upon the same axis, two stops borne by said disk in position to limit in both directions the independent movements of the sand-glass, means for rotating the disk, means for arresting it when one of the stops is in position to support it in an inclined position with the sand above the axis, a battery, and electric conductors leading from the battery and making circuit through the contact-point of the sand-glass and said supporting-stop.

7. The combination with a rotary drum, a gear, and means for locking the gear against rotation, of means for rotating the drum in one direction, means whereby such rotation unlocks said gear, means for rotating the drum in the contrary direction, and means whereby said gear shares such contrary rotation.

8. The combination with a gear, of devices automatically locking the gear at each half-revolution, a second gear engaging the first, a drum, means for rotating the drum in one direction, means whereby such rotation unlocks the gear first mentioned, means for rotating the drum in the contrary direction, and means whereby the second gear is forced to share such contrary rotation; whereby the first gear is turned by steps of one hundred and eighty degrees.

9. The combination with an electric circuit, of a normally-inclined sand-glass mounted to rotate on a central transverse axis and to oscillate thereon as the sand passes from one side of the vertical plane of the axis to the other, thus making and breaking the circuit, a disk revolubly mounted alongside the sand-glass and provided with an arm in position to engage the sand-glass as the disk rotates, means for rotating the disk, and means for arresting such rotation at intervals of one hundred and eighty degrees.

10. In an automatic electric circuit opener and closer, the following elements and mechanical parts in combination: the box A, the frame B, the frame-plate B', the grooved drum-shaft C journaled in the frame B and the frame-plate B', the chains D, $d$, E and F, the cams $c$, the two-toothed ratchet-disk $c'$, the gear-wheel G, the pawls $g$, the tension-springs $g'$, the helical spring H, the spool I, the weighted lever J, the shoulder $k$ formed in the bar K, the lug L, the spring M, the current-shaft N journaled in the frame B and frame-plate B', the time glass or tube O, the set-screw P, the shim R, conducting-spindle S, the plate $s$, the wire $t$, the battery T, the rods $n$, the combination gear-wheel and two-toothed ratchet-disk U, the current-arm $u'$, the stop-arm $u$, the plates $u^2$, the wire $t'$, the ratchet-bar V, the guide W, the plate $y'$, the wire $t^2$, the electric bell Q, the wire $t^3$, the battery T, the jaw $b'$, and the wedge-shaped brake Y, all as and for the purposes set forth.

JAMES H. WINSPEAR.
FRED R. SMITH.

Witnesses:
THOMAS J. DAVIS,
S. Y. SANSOM.